United States Patent [19]

Baker et al.

[11] Patent Number: 5,094,466
[45] Date of Patent: Mar. 10, 1992

[54] WATER PUMP SEAL WITH IMPROVED SEAL FORCE DISTRIBUTION

[75] Inventors: Steven F. Baker, Bellevue; Joseph L. Tengowski, Norwalk, both of Ohio

[73] Assignee: General Motors Corporation, Detroit, Mich.

[21] Appl. No.: 519,086

[22] Filed: May 4, 1990

[51] Int. Cl.⁵ .............................................. F16J 15/36
[52] U.S. Cl. .................................... 277/87; 277/42; 277/89; 277/93 SD; 277/207 R
[58] Field of Search .................... 277/88, 89, 90, 42, 277/43, 93 R, 93 SD, 85, 81 R, 211, 37, 87, 207 R

[56] References Cited

U.S. PATENT DOCUMENTS

| | | |
|---|---|---|
| 2,722,439 | 11/1955 | Brummer et al. ...................... 277/42 |
| 2,806,720 | 9/1957 | Meyer ................................... 277/37 |
| 3,020,052 | 2/1962 | Gits ....................................... 277/89 |
| 3,117,793 | 1/1964 | Houser et al. ..................... 277/42 X |
| 3,138,390 | 6/1964 | Jensen .................................. 277/42 |
| 3,356,376 | 12/1967 | Bradfute et al. .................. 277/42 X |
| 3,782,735 | 1/1974 | Novosad ............................... 277/22 |
| 3,904,211 | 9/1975 | Dega ..................................... 277/32 |
| 4,451,049 | 5/1984 | Charhut ................................ 277/42 |

FOREIGN PATENT DOCUMENTS

| | | | |
|---|---|---|---|
| 150255 | 9/1920 | United Kingdom ................ 277/211 |
| 859860 | 1/1961 | United Kingdom ................. 277/37 |

*Primary Examiner*—Allan N. Shoap
*Attorney, Agent, or Firm*—Patrick M. Griffin

[57] ABSTRACT

A vehicle water pump seal has a specially designed gasket interposed between the retainer flange that the spring bears on and the sealing ring that transmits the spring force evenly in spite of bowing in the retainer flange.

3 Claims, 2 Drawing Sheets

WATER PUMP SEAL WITH IMPROVED SEAL FORCE DISTRIBUTION

This invention relates to vehicle water pump seals in general, and specifically to such a seal that has an improved means for distributing the force of a spring to the sealing interface.

BACKGROUND OF THE INVENTION

While myriad vehicle water pump seal designs can be found in both the published patents and in commercial practice, there are basic similarities in most of the designs. Given the high speeds, heat, and corrosive environment to which such a seal is subjected, it is necessary that the two seal members that are in direct contact be made of heat and wear resistant materials. Given the critical nature of the water pump itself, it is also necessary that the sealing interface be maintained as closely as possible, so as to minimize potential coolant leakage and protect the water pump bearing. As a consequence, almost all designs use a rotating annular sealing ring of a ceramic material or the like, which contacts a stationary seal face of similar material. The contacting surfaces can be machined and lapped very accurately. If the rest of the seal assembly can maintain the rubbing surfaces in close contact, a good seal can be maintained.

Most water pump seal designs have found it necessary to provide a strong spring force to continually push the rubbing surfaces together and overcome any other forces tending to part them. It is generally not practical to have the spring bear directly on the rotating seal ring, however. The spring typically bears instead on a flange of a stamped metal retainer that is axially opposed to the rotating seal ring, and which transfers the spring force to it. In addition, an elastomer layer of constant thickness is usually interposed between the rotating ring and the metal flange. The elastomer layer maintains a fluid tight seal between the metal retainer and the sealing ring and allows some give between the two parts. The spring tends to promote rubbing wear, however, so most pump housing designs deliberately allow for a small amount of leakage. It is also generally accepted that such seals will be replaced after a certain number of miles. As a consequence, the metal components are usually stampings, which are relatively inexpensive, but which have inherently more manufacturing variation than machined parts. The flange that bears indirectly on the seal ring, for example, may be bowed so as to have a pair of diametrically opposed high spots or areas. These high spots will transfer an uneven, two point spring load from the flange, through the elastomer layer and to the sealing ring, without some means of compensation. Uneven loading can cause increased wear at the seal interface.

SUMMARY OF THE INVENTION

The invention provides a seal assembly that can compensate for such manufacturing variation, and which more evenly distributes the spring pressure to the sealing interface.

In the embodiment disclosed, an annular ceramic sealing ring is surrounded by and mounted to a stamped steel retainer that rotates relative to the vehicle. The retainer has an annular flange that is axially opposed to the back face of the ring. The front face of the ring is machined flat with a high degree of accuracy so as to bear on a similarly machined surface of a seal face that is fixed relative to the vehicle. A spring compressed against the retainer flange supplies the pressure that maintains a tight sealing interface. The retainer is stamped as described above, so its flange tends to have a pair of diametrically opposed high spots or raised areas.

The invention prevents uneven loading at the seal interface through the use of a specially designed annular gasket interposed between the retainer flange and the back face of the sealing ring. The gasket is molded of an elastomer material that is resilient and partially compressible, but still hard enough to transfer loads efficiently from the flange to the sealing ring. The outer surface of the gasket, which directly contacts the retainer flange, is basically flat. The inner surface of the gasket, which contacts the back face of the sealing ring, is molded with three evenly spaced arcuate grooves. The grooves are concentric with the gasket, but cover less than the entire radial width of the inner surface of the gasket. The arcuate grooves are separated by three intervening flat areas, which, in effect constitute raised pads relative to the grooves.

Because there are three evenly spaced raised pads on the gasket, and two opposed raised areas on the retainer flange, they cannot exactly align. The force of the spring pushes the raised areas of the flange into the gasket, which is compressed somewhat. From there, the force is transmitted though the three raised gasket pads to the sealing ring, and finally to the seal interface. The force of the spring is, therefore, transmitted indirectly, and distributed more evenly, compensating for any bowing in the retainer flange. In addition, since the arcuate grooves do not cover the entire width of the inner surface of the gasket, an adequate seal is maintained against the back face of the sealing ring.

It is, therefore, a general object of the invention to provide an improved vehicle water pump face seal assembly that compensates for manufacturing variations in a retainer flange that transfers the force of a spring to a sealing ring.

It is another object of the invention to provide a specially designed gasket interposed between the flange and sealing ring that substantially evenly distributes the spring force from the flange to the sealing ring.

It is another object of the invention to compensate for an annular retainer flange that is bowed by providing the gasket with three raised pads designed to deliberately misalign with the raised areas of the bowed flange and transmit the spring force indirectly and more evenly.

DESCRIPTION OF THE PREFERRED EMBODIMENT

These and other objects and features of the invention will appear from the following written description, and from the drawings, in which.

Figure 1:
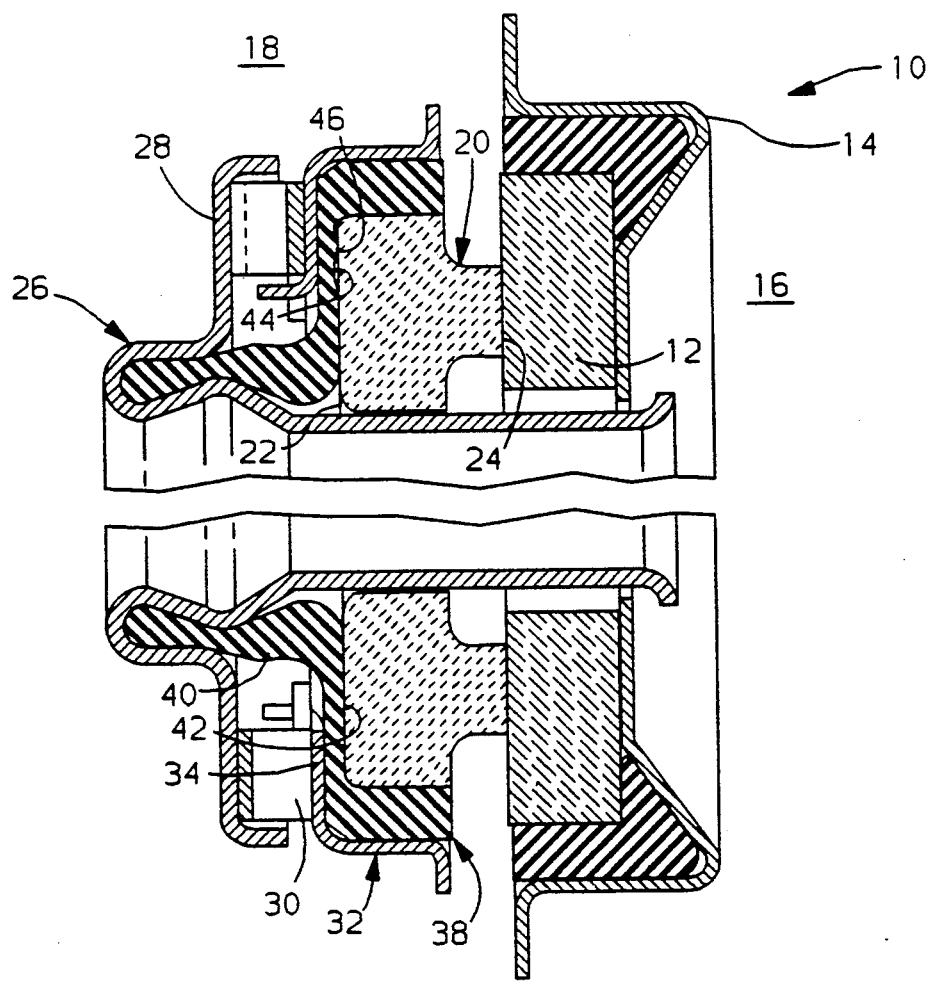
FIG. 1 is a cross sectional view of a preferred embodiment of the invention.

Referring first to FIG. 1, a preferred embodiment of a vehicle water pump face seal assembly incorporating the invention is indicated generally at 10. An annular seal face 12 is formed of ceramic or other suitable material, which is capable of being machined and polished to a high degree of flatness. Seal face 12 is mounted in a frame 14 that is adapted to be fixed in an opening in a stationary pump housing, not shown. To the right of seal face 12, in the area indicated at 16, would be atmosphere or ambient. A rotating pump shaft, also not illustrated, would extend coaxially through the pump housing opening, supported by a bearing. To the left of seal face 12, in the area indicated at 18, would be a volume of fluid coolant that must, to the greatest degree possible, be prevented from leaking to ambient 16. To this end, a ceramic annular sealing ring, indicated generally at 20, is maintained in continual sealing contact with seal face 12. Sealing ring 20 is of similar diameter to seal face 12, with a flat back face 22 and an annular front face 24 that is also machined and polished to a high level of smoothness. To prevent leakage from 18 to 16, a fluid tight seal must be maintained at both the front face 24 and back face 22 of sealing ring 20. A stamped steel casing, indicated generally at 26, is adapted to be fitted tightly over the outside of the pump shaft. Casing 26 has a radially extending wall 28 that is oriented coaxial to and axially spaced from sealing ring back face 22, and which is substantially rigid. Wall 28 provides the foundation from which sealing pressure is applied to the sealing interface, as described next.

Figure 3:
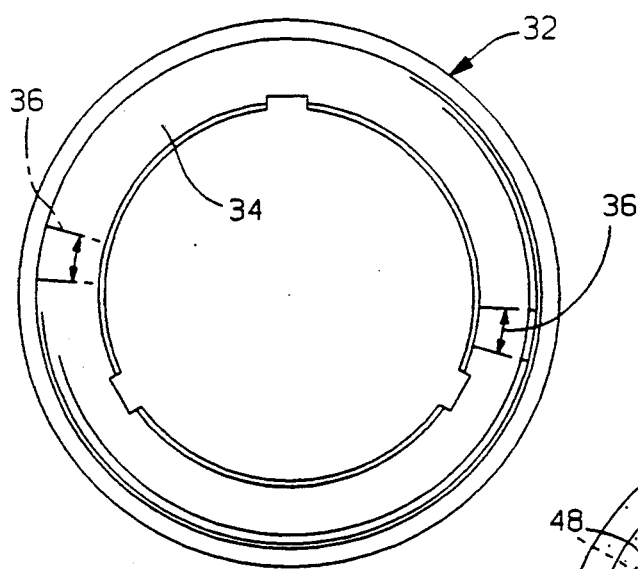
FIG. 3 is a plan view of the stamped retainer alone.

Referring next to FIGS. 1 and 3, a compression spring 30 is axially compressed between wall 28 and a stamped steel retainer, indicated generally at 32. Specifically, spring 30 bears against an annular retainer flange 34. Flange 34 is also coaxial to and axially spaced from sealing ring back face 22. Retainer 32 performs several functions, including holding sealing ring 20 into the assembly 10 and transferring the rotation of casing 26 to sealing ring 20. Most pertinent to the invention here, the retainer flange 34 transfers the force of spring 30 to sealing ring 20, in cooperation with a component described next. Ultimately, pressure is provided at the interface between the rotating sealing ring front face 24 and stationary seal face 12. The quality and life of the sealing interface so maintained will depend, in part, on how evenly the sealing pressure is applied. A potential problem in that regard is the fact that it is difficult to stamp retainer 32 so that flange 34 is absolutely flat. Flange 34 is subject to bowing, which creates a pair of generally diametrically opposed raised spots or areas 36, best illustrated in FIG. 3. The raised areas 36 are exaggerated in size in FIG. 3, and would be difficult to see in practice. Nevertheless, if allowed to contact sealing ring back face 22 directly, the raised areas 36 would transfer an uneven, two point load from spring 30 to the sealing interface. The same would hold true even if another, constant thickness component were interposed between flange 34 and sealing ring 20.

Figure 2:
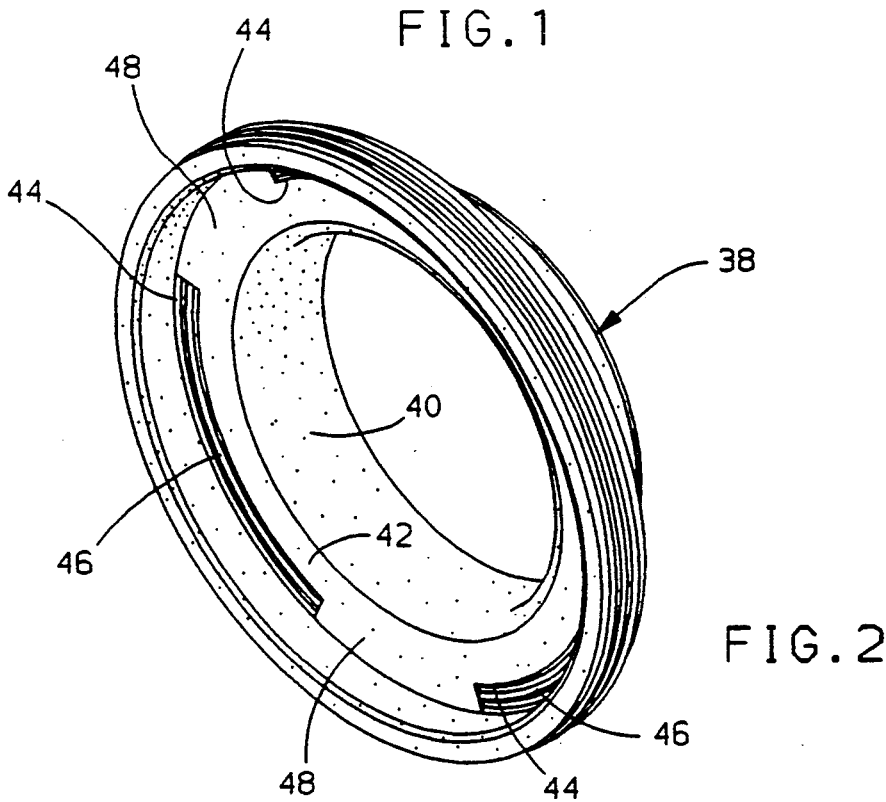
FIG. 2 is a perspective view of a sealing bellows incorporating the specially designed gasket according to the invention.
Figure 4:
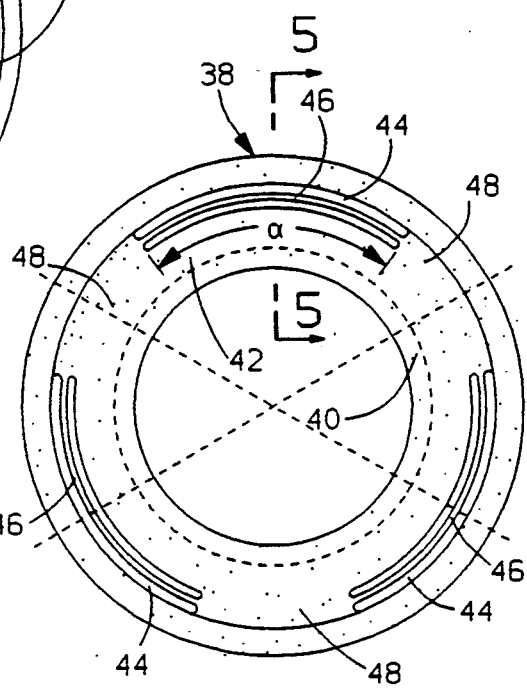
FIG. 4 is a plan view of the inner surface of the gasket.
Figure 5:
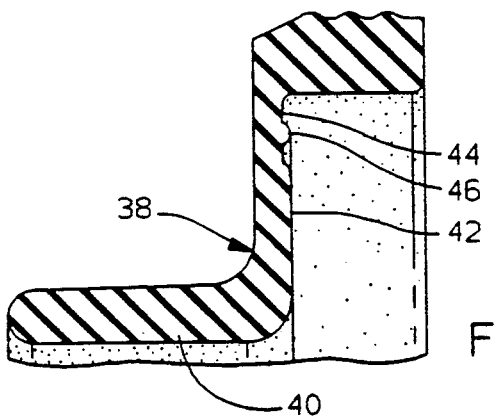
FIG. 5 is a sectional view of the gasket taken along the line 5—5 of FIG. 4.

Referring next to FIGS. 2, 4, and 5, seal assembly 10 has a component interposed between retainer flange 34 and sealing ring 20 that does compensate for the bowing. A bellows, indicated generally at 38, is molded from an elastomer, such as high temperature rubber. As such, it is resilient and partially compressible, and will conform closely to any harder surface against which it is forced, giving a fluid tight seal. Still, the material is hard enough to transfer loads, once it has been compressed. Bellows 38 is generally L shaped in cross section, with a central sleeve 40 and an annular gasket 42. Gasket 42 has a plain, flat outer surface, but the inner surface is more complex. The inner surface of gasket 42 includes three relieved areas in the form of evenly spaced arcuate grooves 44. Each groove 44 subtends an angle $\alpha$ of approximately seventy five degrees, but covers less than half of the total radial width of gasket 42. In addition, in the embodiment disclosed, a central arcuate rib 46 runs down the middle of each groove 44. The still flat, non grooved areas of the inner surface of gasket 42 create, in effect, three evenly spaced pads 48, which can be considered raised, at least in relation to the lower grooves 44. Each pad 48 would subtend about forty five degrees. Consequently, it is not possible for the diametrically opposed flange raised areas 36 to each align with a gasket raised pad 48. FIG. 4 shows a couple of dotted lines through the center to illustrate how it is assured that at least one flange raised area 36 would line up with a groove 44, rather than with a pad 48, and possibly both. This relationship is instrumental in compensating for any bowing in retainer flange 34, as is described next.

Figure 6:
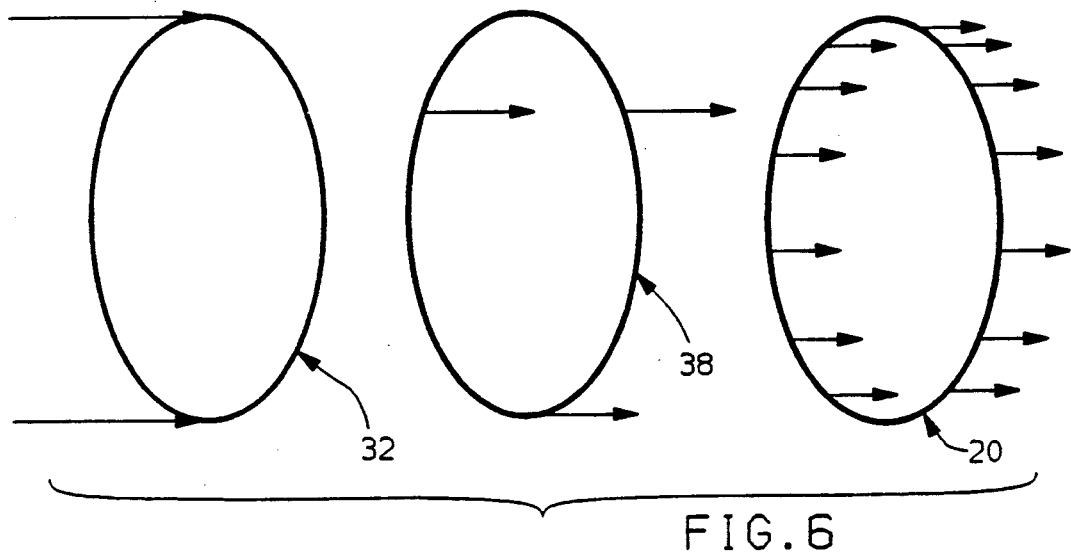
FIG. 6 is a schematic representation of the distribution of the spring force from the flange through the gasket and finally to the sealing ring.

Referring next to FIGS. 1 and 6, bellows 38 is assembled by crimping the end of sleeve 40 into casing 26, and by capturing gasket 42 between sealing ring 20 and retainer flange 34. After assembly, the spring 30, retainer flange 34, and arcuate grooves 44 are all substantially co-radial, although a good portion of the sealing ring back face 22 and of the inner surface of gasket 42 are radially inboard of spring 30. When seal assembly 10 is installed, casing 26 is axially set relative to frame 14 so as to compress spring 30 between casing wall 28 and retainer flange 34. The force of compressed spring 30 pushes retainer flange 34 toward sealing ring 20, which will compress the flange raised areas 36 into the outer surface of gasket 42 to an extent. While this sinking in effect would tend to dissipate the two point loading condition to some degree, it would not be sufficient alone to adequately evenly distribute the force of spring 30, which would still be transmitted through gasket 42 in localized, two point fashion. However, because of the assured misalignment described above, it is the three raised pads 48 that are forced into the sealing ring back face 22. The at least one raised area 36 that is located over a groove 44 cannot transmit its force directly, but will be bifurcated between the two adjacent gasket raised pads 48, and transmitted to the sealing ring 20 indirectly. This assures that a more balanced force, is transmitted through sealing ring 20 to give a substantially even pressure at the sealing interface with stationary seal face 12. The forced redirection and redistribution of force through the various components, two point, to three point, to an even distribution at the sealing interface, is illustrated schematically by arrows in FIG. 6.

Variations could be made in the disclosed embodiment. An odd number of raised pads greater than three would assure that the diametrically opposed flange raised areas 36 could not directly transmit force through the gasket 42. Three pads 48, as disclosed, should be adequate, however. The raised pads could also be formed directly by actual protuberances, rather than indirectly by the grooves 44 that leave the intervening flat areas. The material of which gasket 42 is formed could also be harder than the resilient and conformable rubber material disclosed. The advantage of the narrow grooves 44 formed as shown into a gasket surface of compressible material is to assure that a continuous fluid tight seal is created against sealing ring back face 22 by the radially inboard portion of the surface that remains flat. Likewise, the central groove rib 46 could be eliminated, but it also helps to prevent leakage radially inwardly across a groove 44, since it is compressed against sealing ring back face 22 as well. However, the ribs 46 are too thin to jeopardize the basic spring force redirection and resdistribution effect of the grooves 44. Therefore, it will be understood that it is not intended to limit the invention to just the embodiment disclosed.

The embodiments of the invention in which an exclusive property or privilege is claimed are defined as follows:

1. In a face seal assembly of the type that has a sealing ring maintained in continual sealing contact against a seal face by a spring compressed against an annular retainer flange opposed to said sealing ring, and in which said retainer flange is subject to manufacturing variations that create diametrically opposed raised areas, a means for evenly distributing the force of said spring from said flange to said sealing ring, comprising:
   a gasket located between said retainer flange and said sealing ring, said gasket further having an outer surface in contact with said flange and an inner surface comprising an odd number of substantially evenly spaced raised pads circumferentially spaced apart and in contact with said sealing ring and separated by intervening relieved areas;
   whereby, said spring forces said flange raised areas into said gasket outer surface misaligned with said raised pads and with at least one raised area located over a relieved area, by virtue of the odd number of relieved areas, thereby indirectly forcing said raised pads against said sealing ring to distribute the force of said spring substantially evenly to said sealing ring.

2. In a face seal assembly of the type that has a sealing ring maintained in continual sealing contact against a seal face by a spring compressed against an annular retainer flange opposed to said sealing ring, and in which said retainer flange is subject to manufacturing variations that create diametrically opposed raised areas, a means for evenly distributing the force of said spring from said flange to said sealing ring, comprising,
   a gasket located between said retainer flange and said sealing ring, said gasket further having an outer surface in contact with said flange and an inner surface comprising three substantially evenly spaced raised pads circumferentially spaced apart and in contact with said sealing ring and separated by three intervening relieved areas;
   whereby, said spring forces said flange raised areas into said gasket outer surface misaligned with said raised pads and with at least one raised area located over a relieved area, by virtue of the odd number of relieved areas, thereby indirectly forcing said raised pads against said sealing ring to distribute the force of said spring substantially evenly to said sealing ring.

3. In a face seal assembly of the type that has a sealing ring maintained in continual sealing contact against a seal face by a spring compressed against an annular retainer flange opposed to said sealing ring, and in which said retainer flange is subject to manufacturing variations that create diametrically opposed raised areas, a means for evenly distributing the force of said spring from said flange to said sealing ring, comprising,
   an annular gasket located between said retainer flange and said sealing ring, and comprised of a resilient material that is partially compressible, said gasket further having an outer surface in contact with said flange and a flat inner surface in contact with said sealing ring including three substantially evenly spaced arcuate grooves circumferentially spaced apart and comprising less than the entire radial width of said inner surface and separated by three intervening flat areas,
   whereby, said spring forces said flange raised areas into said gasket outer surface misaligned with said flat areas, and with at least one raised area located over an arcuate groove, by virtue of the odd number of arcuate grooves, thereby indirectly forcing said flat areas against said sealing ring to distribute the force of said spring substantially evenly to said sealing ring while maintaining a fluid tight seal between said sealing ring and said gasket inner surface.

* * * * *